United States Patent [19]

Nakamura et al.

[11] Patent Number: 4,498,331

[45] Date of Patent: Feb. 12, 1985

[54] KNOCKING DETECTING APPARATUS FOR INTERNAL COMBUSTION ENGINES

[75] Inventors: Hirotoshi Nakamura; Teruyoshi Itoh; Hiroshi Haraguchi, all of Kariya; Kou Narita; Toshiharu Iwata, both of Aichi; Takeshi Matsui, Toyohashi, all of Japan

[73] Assignee: Nippondenso Co., Ltd., Kariya, Japan

[21] Appl. No.: 483,016

[22] Filed: Apr. 7, 1983

[30] Foreign Application Priority Data

Apr. 8, 1982 [JP] Japan ................................. 57-59424

[51] Int. Cl.³ ........................................ G01M 15/00
[52] U.S. Cl. ...................................................... 73/35
[58] Field of Search ..................... 73/35; 123/417, 425

[56] References Cited

U.S. PATENT DOCUMENTS 4,300,503 11/1981 Deleris et al. ..................... 73/35 X
4,355,534 10/1982 Roger ..................................... 73/35

Primary Examiner—Jerry W. Myracle
Attorney, Agent, or Firm—Cushman, Darby & Cushman

[57] ABSTRACT

In a knocking discriminating system for an internal combustion engine, a knocking detecting signal obtained from a knocking sensor is passed through a bandpass filter for obtaining a sinusoidal waveform of approximately 8 KHz. The sinusoidal waveform signal is then applied to an A/D converter, the operational timing of which is controlled by a microcomputer, so that only a part of the knocking detecting signal nearby the peak portion is converted into digital values. A discrimination level is prepared from the average value of the digital values, and the knocking status is discriminated by comparing the maximum value of the digital values thus converted with the discriminating level.

6 Claims, 8 Drawing Figures

KNOCKING DETECTING APPARATUS FOR INTERNAL COMBUSTION ENGINES

FIELD OF THE INVENTION

This invention relates to apparatus for detecting the occurrence of knocking (or detonation) during the operation of an internal combustion engine, and more particularly to an apparatus wherein an output signal from a knocking sensor is firstly A/D converted and then subjected to a discrimination step.

DESCRIPTION OF THE PRIOR ART

A conventional knocking detecting apparatus, for instance, disclosed in U.S. Pat. No. 4,111,035 comprises a knocking sensor which detects vibrations and the like entailing the knocking, a filter circuit for selecting a knocking frequency component (for instance, 8 KHz) from the output signal delivered from the knocking sensor so as to provide a knocking detecting signal, an average circuit for delivering an average value of the knock detecting signal delivered from the filter circuit, a discrimination level setting circuit for setting a knocking discrimination level out of the average value delivered from the average circuit, and a comparison circuit which compares the knocking detecting signal with the knocking discrimination level for determining whether the knocking occurs or not. However, since these individual circuits are made of analog elements such as linear ICs and hence the detection of knocking is effectuated in an analog manner, the controllable range of the apparatus has been restricted regardless of the complicated circuitry, thus rendering it difficult to control, for instance, the knocking discrimination level in accordance with the operating condition, such as the rotating speed of the engine, and to discriminate the occurrence of knocking accurately.

The above described difficulties of the conventional knocking detecting apparatus may be obviated in some extent by utilizing a knocking detecting apparatus of a digital type comprising an A/D converter and a microcomputer. In this case, however, an accurate A/D conversion of the knocking detecting signal requires extremely high-speed operation of the A/D converter for tracing the waveform of the knocking detecting signal, thus increasing the cost of the A/D converter and hence the cost of the apparatus. Although a procedure for sample holding peak values of the knocking detecting signal instead of tracing the same and then carrying out the A/D conversion may be considered, such a procedure inevitably requires an additional peak holding circuit.

SUMMARY OF THE INVENTION

An object of the present invention is to provide a knocking detecting apparatus wherein all of the above described difficulties of the conventional apparatus can be substantially eliminated.

Another object of the invention is to provide a knocking detecting apparatus of a digital type wherein no peak holding circuit is required, and therefore the construction of the apparatus is substantially simplified.

According to the present invention, the fact that the output signal from the sensor includes a low-frequency component due to the vibration of the engine, a frequency component due to the combustion and the like, and a high-frequency component due to the ignition, and that the low-frequency component and the high-frequency component can be eliminated by a filter for delivering a knocking detecting signal of a predetermined frequency (for instance, 8 KHz) and in the from of a sine wave is taken into consideration. Furthermore, the fact that the information necessary for the knocking detecting apparatus is not the entire waveform of the knocking detecting signal, but the peak value of the same, and that the slope of the sine vave nearby the peak is far milder than those in the increasing portion and the decreasing portion so that the value of the sine wave nearby the peak is held at a substantially constant value is utilized in the present invention. Thus, the operation of an A/D converter provided in the present invention is initiated after a predetermined delay from an instant where the knocking detecting signal in the form of a sine wave exceeds a predetermined level, thus carrying out the A/D conversion only in the nearby area to the peak value, and the status of the knocking is determined from the thus converted value.

DETAILED DESCRIPTION OF THE INVENTION

The invention will now be described in detail with reference to the accompanying drawings.

Figure 1:
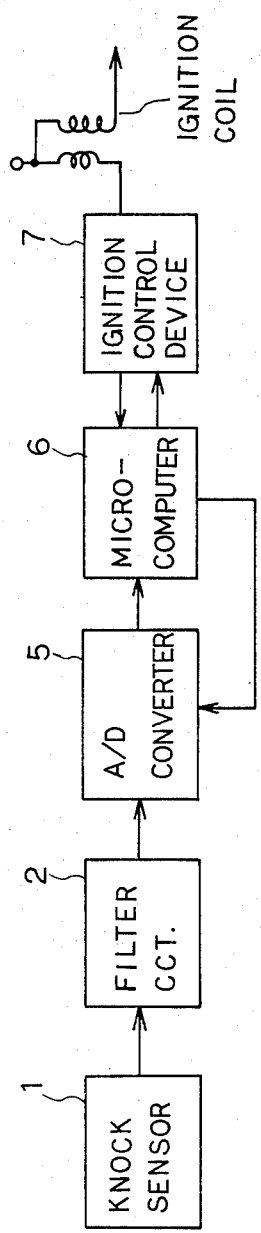
FIG. 1 is a block diagram showing a knocking detecting apparatus consituting an embodiment of the present invention.

In FIG. 1 showing a preferred embodiment of the present invention, numeral 1 designates a sensor for sensing vibration, sound, or the like created by the occurrence of knocking in an engine, numeral 2 designates a filter circuit for passing only a frequency component among those sent by the sensor 1, numeral 5 designates an A/D converter which converts the frequency component passed by the filter circuit 2 into a digital signal, and numeral 6 designates a microcomputer which comprises a central processing unit (CPU), memory devices (ROM, RAM), and an input-output device (I/O) or the like. The microcomputer 6 supplies a timing signal to the A/D converter 5 to initiate the operation, calculates an average value of the digital output signal from the A/D converter 5 thereby to provide a knocking discriminating level, compares a maximum value of the digital signal obtained in a predetermined time interval with the knocking discriminating level for determining whether knocking occurs or not, and referring to an ignition signal from an ignition control device 7 delivers an output signal representing the result of the comparison to the ignition control device 7.

Figure 2:
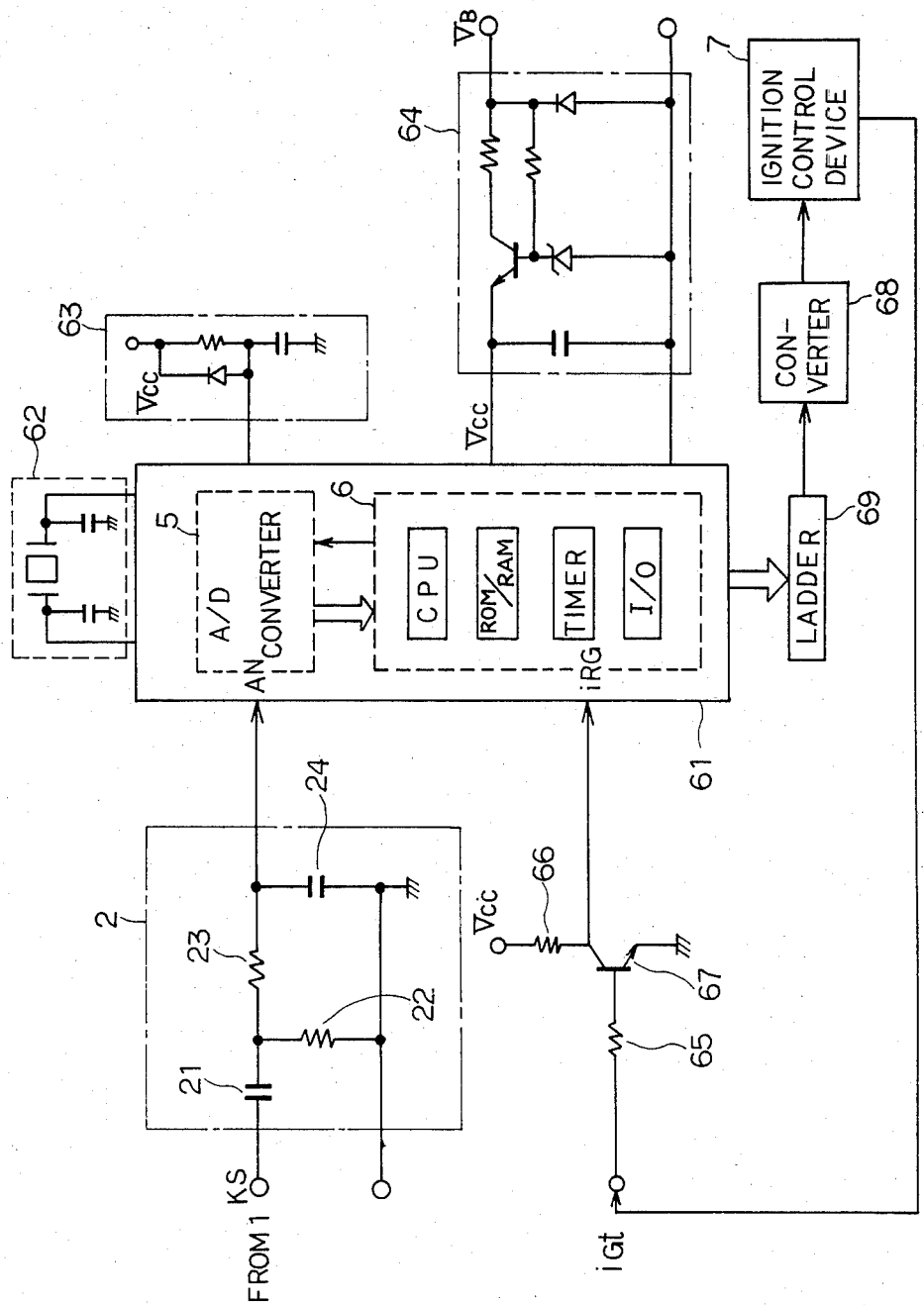
FIG. 2 is a circuit diagram showing the embodiment in more detail.

FIG. 2 illustrates the embodiment shown in FIG. 1 in more detail. The filter circuit 2 is constructed into a band-pass filter comprising a high-pass filter made of a capacity 21 and a resistor 22, and a low-pass filter made of a resistor 23 and a capacitor 24. The output from the sensor 1 is passed through the filter circuit 2 to remove the noise components for providing a knocking detecting signal of a sine wave oscillating at a knocking frequency of approximately 8 KHz. The knocking detecting signal is applied to an analog input terminal AN of a one-chip microcomputer 61 including the A/D converter 5 and the microcomputer 6. In this embodiment, MB88413 made by Fujitsu Limited is employed as the one chip microcomputer 61. The one chip microcomputer 61 is connected with a conventional quartz oscillator 62 a power source ON/RESET circuit 63, and a stabilized power source circuit 64. Furthermore, an ignition signal (iGt) from the ignition control device 7 is applied to an interrupting terminal iRQ of the one chip microcomputer 61 through an inverter comprising an input resistor 65, a collector resistor 66 and a transistor 67. The output from the microcomputer 61 is D/A converted by a resistance ladder 69 and applied through a voltage/current converter 68 to the ignition timing control device 7.

Figure 3:
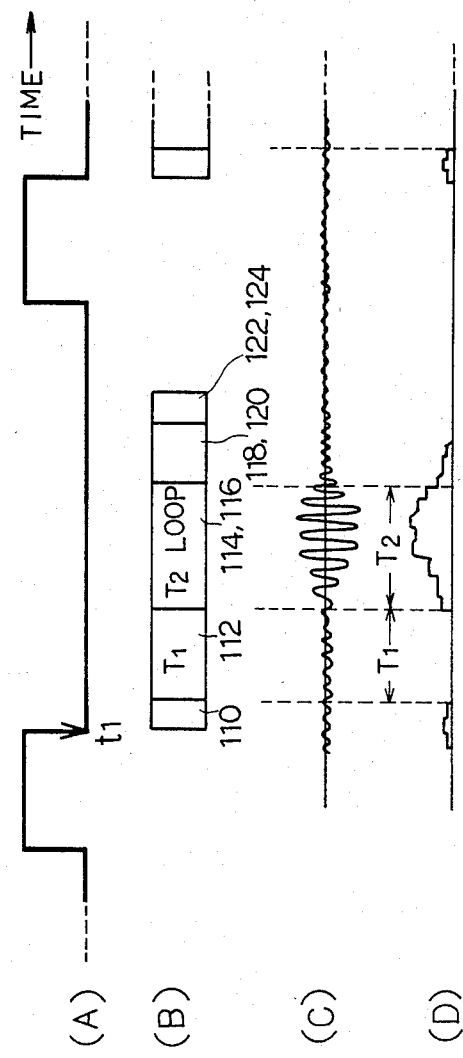
FIG. 3 is a timing chart showing the timing of various processes carried out in the embodiment shown in FIG. 1.
Figure 4:
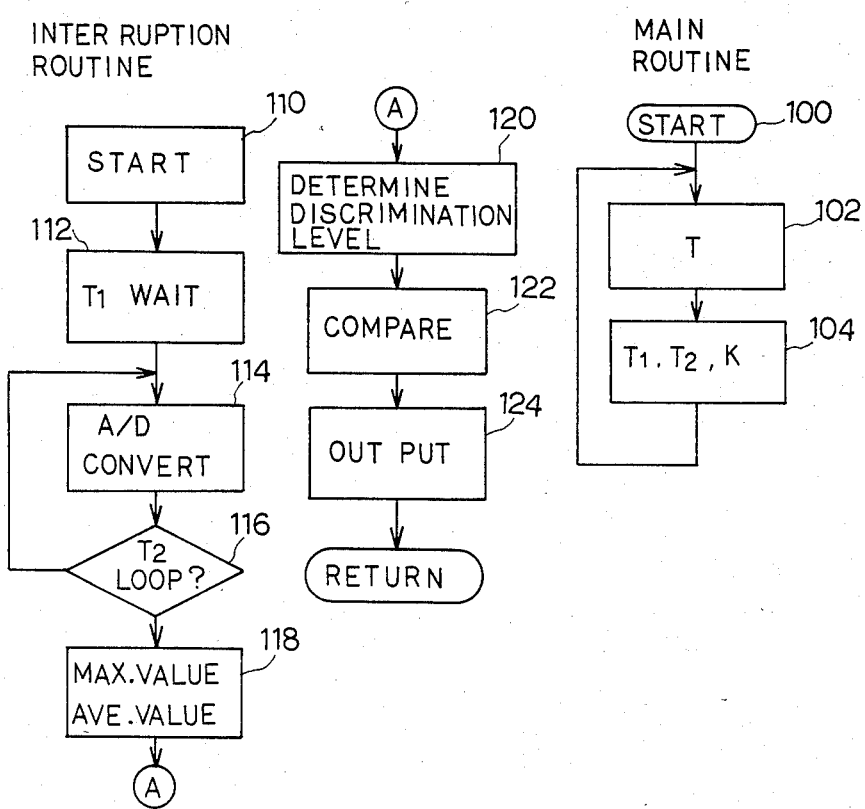
FIGS. 4 and 6 are flow charts showing the sequence of process steps to be carried out by a microcomputer.

The operation of the embodiment will now be described with reference to FIGS. 3 through 6. FIG. 3 is a timing chart showing the timings of the knocking detection, discrimination, and the lagging phase angle calculation. FIG. 4 is a flow chart showing a basic flow of the programs. In the main routine starting with a step 100, operations as follows are carried out utilizing a self-contained timer and the like. More specifically, an ignition period T is calculated in step 102, and based on the ignition period T, a delay time (masking time) T1 of the initiation of the A/D conversion, a time T2 (discriminating time) required for the A/D conversion, a multiplying rate (K value) for multiplying the average value of the knocking detecting signal for the purpose of obtaining the discrimination level to be compared with the A/D converted value, and an offset value for adding a predetermined value to the average value are calculated in step 104.

Since the ignition signal iGt from the ignition control device 7 applied to the interruption input terminal iRQ of the one chip microcomputer 61 has been inverted by the transistor 67 (210 in FIG. 3), the interruption is initiated by the falling signal (at the instant T1 in FIG. 3). An interruption routine is started in the step 110. After the initiation of the interruption, the microcomputer delays the A/D conversion for a period corresponding to the masking time T1 (step 112). Upon expiration of the masking time, the A/D conversion is effectuated in repetition (steps 114, 116) based on the time T2. After accomplishment of the conversion, a maximum value and an average value of the converted values are determined in step 118 simultaneous with the determination of the discrimination level which is equal to the average value ×K value +offset value (step 120).

The maximum value of the A/D converted results is compared with the discriminating level (step 122), and a signal indicative of the compared result is delivered from the output port in 8 bits of the microcomputer (step 124). The signal is then D/A converted by the resistance ladder 69, and the resultant analog value is further subjected to a voltage/current conversion of the converter 68, and then applied to the ignition control device 7. In the above described operation, the compared result is expressed by a delayed phase angle.

The above described masking time T1 and A/D conversion time T2 are both proportional to the ignition period T (T1 is selected in a range of from 1 to 2.5 ms, while T2 is selected in a range of from 2 to 6 ms), and the average value is calculated by use of a software. Furthermore, the discrimination level is selected to be three levels which the first level is equal to the average value ×K value ×offset value, the second level is equal to the first level ×2, while the third level is equal to the first level ×3. In a case the maximum value falls between the first and second levels, the knocking is judged to be a trace knocking, when the maximum value falls between the second and third levels, the knocking is judged to be a light knocking, and when the maximum value exceeds the third level, the knocking is judged to be a heavy knocking. The judged result (intensity) is delivered to the ignition control device 7 (in FIG. 1) in the form of a delaying or lagging phase angle which is in this embodiment in a range of from 0° to 16° CA.

Figure 6:
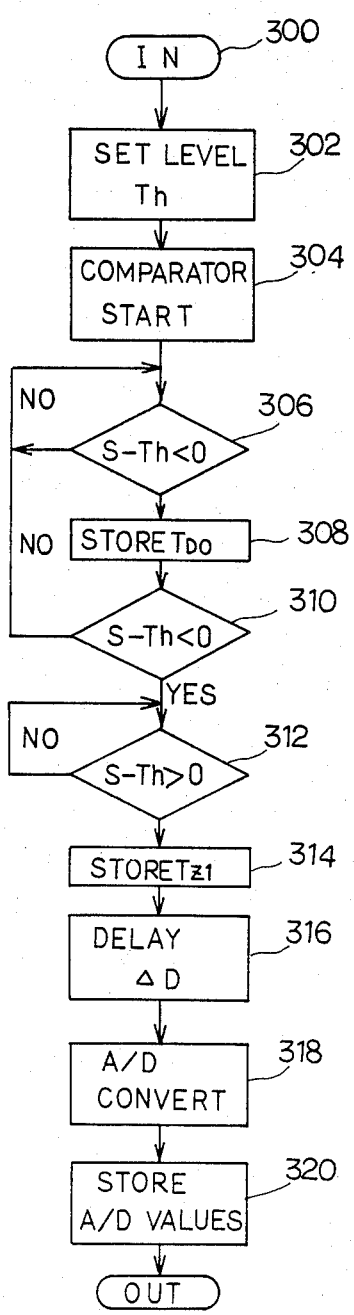
Figure 7:
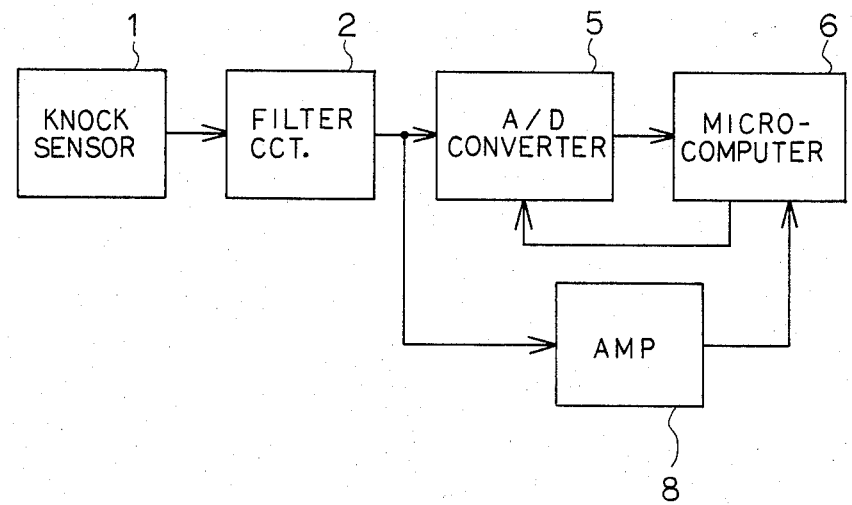
FIG. 7 is a block diagram showing another embodiment of the present invention.

The A/D conversion step 114 which constitutes an important part of this invention will be described in more detail with reference to FIGS. 6 and 7.

Figure 5:
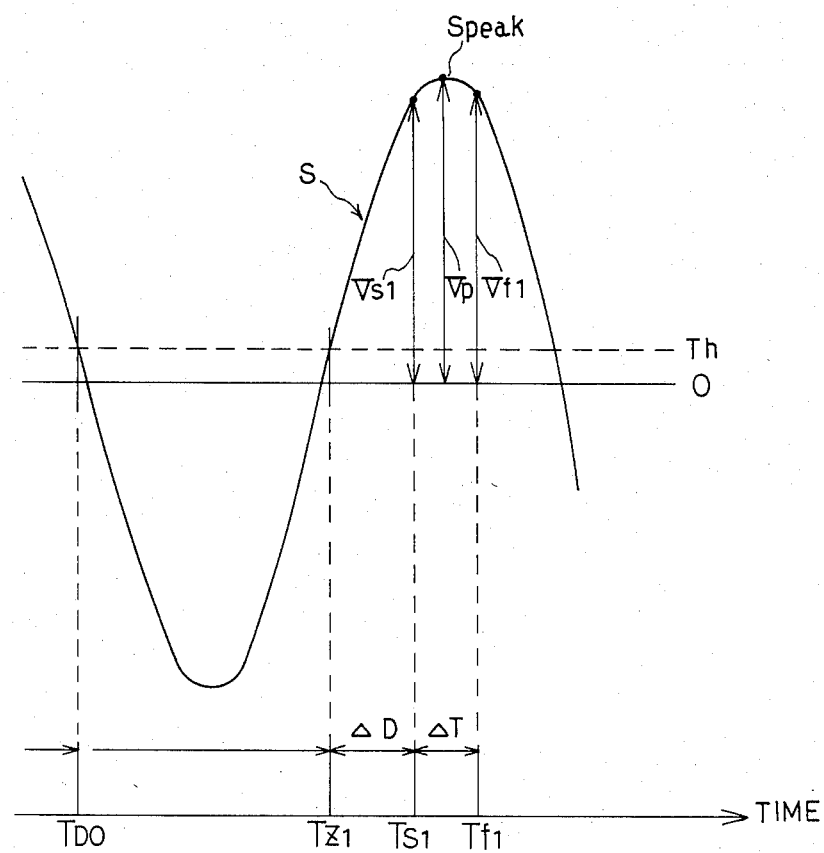
FIG. 5 is a diagram showing the timing of an A/D conversion carried out in the apparatus shown in FIG. 2.

A signal S shown in FIG. 5 corresponding to one cycle period of the knocking detecting signal is of a sinusoidal waveform of 8 KHz. When the A/D conversion step is started with a step 300, a comparison mode is designated in the one chip microcomputer, and a threshold level Th is set in step 302. The comparison is executed in step 304, and in step 306 whether the detecting signal goes down below the threshold level Th or not is detected. In step 308, the time instant $T_{DO}$ when the signal goes down below the threshold level is memorized. In order to eliminate erroneous operations, whether $S - Th < 0$ or not is further confirmed in step 308. After the detection of the instant $T_{DO}$, the operation goes to step 310 wherein whether $S - Th < 0$ or not, that is an increasing instant of the signal is detected, and the increasing instant $T_{Z1}$ is memorized in step 314. In step 316, a time instant $T_{S1}$ which is delayed for a predetermined time period Δ D from the time instant $T_{Z1}$ is selected, and the A/D conversion is started at this instant TS1 in step 318.

The A/D conversion is carried out for a period ΔT extending around the peak point of the sinusoidal waveform of the signal S placed at the center. Since the slope of the signal S in the period ΔT is far milder than those in the increasing or decreasing portions thereof, the results of the A/D conversion carried out for the period ΔT are considered to be substantially constant. More specifically, assuming that the A/D converted value for the peak point of the signal S is $V_p$, values $v_{S1}$ and $V_{f1}$ A/D converted at the instants $T_{S1}$ and $T_{f1}$ (ending instant of the A/D conversion) are different from $V_p$ by merely slight amounts, and since a successive comparison type A/D conversion is utilized in this case, the results of the conversion approximate the peak value $V_p$ better than the Values $V_{S1}$ and $V_{f1}$. In step 320, A/D converted values are read out to be memorized, and the operation is shifted to the subsequent step.

Figure 8:
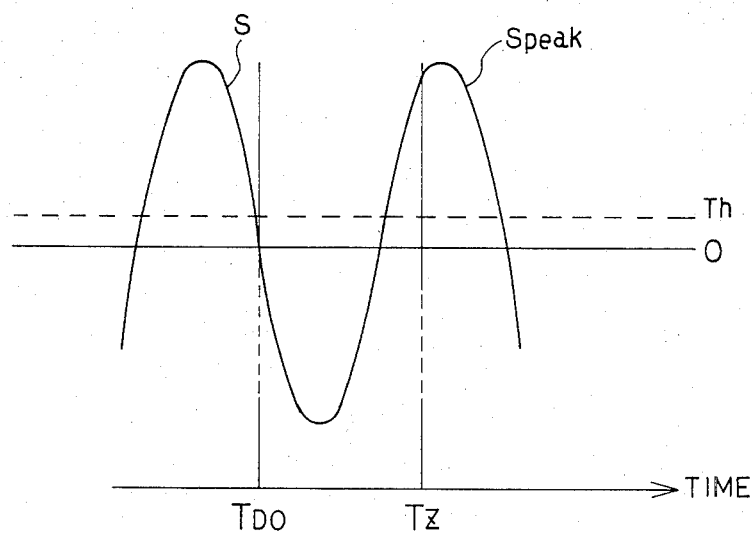
FIG. 8 is a waveform diagram showing the timing of A/D conversion carried out in the apparatus shown in FIG. 7.

Another embodiment of the present invention will now be described with reference to FIG. 7. In this embodiment, a knocking detecting signal delivered from a sensor 1 and passed through a filter circuit 2 is introduced into a microcomputer 6 through an A/D converter 5 and an amplifier 8 which detects increase or decrease down of the signal in excess of a threshold level Th. The detecting signal is introduced into the microcomputer 6 through an interrupting terminal with a synchronism of the interruption maintained between the increase or decrease of the signal. In this embodiment apparatus, since a hardware interruption is utilized instead of the software comparison in the previous embodiment, the response speed of the apparatus is substantially improved. After detection of the synchronism, the microcomputer 6 delivers a start signal for starting operation of the A/D converter 5. More specifically, as shown in FIG. 8, an instant $T_{D0}$ when the signal decreases from the threshold level Th is detected, and the microcomputer 6 delays the starting instant $T_Z$ measured from the instant $T_{D0}$ of the A/D converter 5 by an amount predicted by the computer 6. In this manner, the starting instant $T_Z$ of the A/D converter 5 can be varied depending on the operating speed of the A/D converter and the frequency of the detecting signal for obtaining correct values of the peak point of the knocking detecting signal.

Although in the above described embodiment, the A/D conversion has been carried out each time when the knocking detecting signal passes through the threshold level Th, it is also possible that the A/D conversion is carried out each time when the knocking detecting aignal passes through the threshold level a predetermined number of times.

What we claim is:

1. A knocking detecting apparatus for an internal combustion engine comprising:
   a knocking sensor for detecting the existence of a knocking detecting signal having a frequency specific to knocking;
   an A/D converter for converting the knocking detecting signal into digital values after a predetermined delay time from the instant when the knocking detecting signal passes through a predetermined level; and
   a microcomputer which instructs the A/D converter about an instant of initiating the A/D conversion of the knocking detecting signal, and discriminates the occurrence of knocking from the digital values thus converted.

2. A knocking detecting apparatus according to claim 1 wherein said knocking sensor is directly secured to said engine for detecting knocking and includes a band-pass filter for filtering the signal delivered from the sensor.

3. A knocking detecting apparatus according to claim 2 wherein said microcomputer comprises means for setting a predetermined threshold level, means for detecting that the signal passed through the band-pass filter goes down below the threshold level, means for detecting the instant when the signal thereafter goes up in excess of the threshold level, and means for initiating the A/D operation after a predetermined delay time from said instant.

4. A knocking detecting apparatus according to claim 1 wherein said microcomputer calculates an average value of the output of the A/D converter, and produces a first discrimination level for discriminating the occurrence status of knocking based on the average value.

5. A knocking detecting apparatus according to claim 4 wherein said microcomputer produces the first discrimination level in accordance with the following equation:

$$\text{first discrimination level} = \text{average value} \times K + \text{offset value}$$

wherein K is a constant.

6. A knocking detecting apparatus according to claim 4 wherein said microcomputer further produces second and third discrimination levels out of the first discrimination level, detects a maximum value among the A/D converted values, compares the maximum value with the first, second and third discrimination levels, and discriminates whether the knocking status is trace knocking, light knocking, or heavy knocking.

* * * * *